US010139090B2

(12) United States Patent
Goodrich

(10) Patent No.: US 10,139,090 B2
(45) Date of Patent: Nov. 27, 2018

(54) RECHARGEABLE ILLUMINATING SHOES

(71) Applicant: Joseph Goodrich, Double Oak, TX (US)

(72) Inventor: Joseph Goodrich, Double Oak, TX (US)

(*) Notice: Subject to any disclaimer, the term of this patent is extended or adjusted under 35 U.S.C. 154(b) by 0 days.

(21) Appl. No.: 15/116,810

(22) PCT Filed: Apr. 28, 2016

(86) PCT No.: PCT/US2016/029775
§ 371 (c)(1),
(2) Date: Aug. 4, 2016

(87) PCT Pub. No.: WO2017/078788
PCT Pub. Date: May 11, 2017

(65) Prior Publication Data
US 2017/0314775 A1    Nov. 2, 2017

Related U.S. Application Data

(60) Provisional application No. 62/308,689, filed on Mar. 15, 2016, provisional application No. 62/249,714, filed on Nov. 2, 2015.

(51) Int. Cl.
*F21V 23/04*      (2006.01)
*A43B 3/00*      (2006.01)
*F21L 4/08*      (2006.01)
*F21V 15/01*      (2006.01)
(Continued)

(52) U.S. Cl.
CPC ............ *F21V 23/045* (2013.01); *A43B 3/001* (2013.01); *A43B 3/0005* (2013.01); *F21L 4/08* (2013.01);
(Continued)

(58) Field of Classification Search
CPC ......... A43B 3/001; A43B 3/0005; A43B 7/04; F21V 33/0008
(Continued)

(56) References Cited

U.S. PATENT DOCUMENTS 5,500,635 A * 3/1996 Mott .................... A43B 1/0072
310/311
8,464,442 B1 * 6/2013 Alford, II ........... A43B 1/0027
36/136

(Continued)

OTHER PUBLICATIONS

International Search Report and Written Opinion in related International patent application No. PCT/US2016/029775, dated Aug. 29, 2016, 8 pages.
(Continued)

*Primary Examiner* — William Carter
(74) *Attorney, Agent, or Firm* — Law Office of Jeff Williams; J. Oliver Williams

(57) ABSTRACT

The system of the present application includes a battery structure, a control board, a charging port, a switch, and a light. The battery structure is configured to provide a source of power to illuminate the light. The switch controls the passage of power to the lights and is configured to optionally regulate a pattern of illumination. The charging port is configured to allow for the recharging of the battery structure. The control board is configured to regulate the communication of the switch to the light. The system is configured to provide a method of illuminating an area about the user. The system permits for the selective recharging of the power supply. The system is configured to permit optional remote control capabilities to allow a user to adjust, manipulate, and control one or more features of the lighting system from a device remote from the shoe.

15 Claims, 5 Drawing Sheets

(51) Int. Cl.
- *F21V 23/00* (2015.01)
- *F21V 23/06* (2006.01)
- *F21V 31/00* (2006.01)
- *F21V 33/00* (2006.01)
- *H02J 7/00* (2006.01)
- *F21Y 115/10* (2016.01)

(52) U.S. Cl.
CPC ............ *F21V 15/01* (2013.01); *F21V 23/003* (2013.01); *F21V 23/06* (2013.01); *F21V 31/00* (2013.01); *F21V 33/0008* (2013.01); *F21Y 2115/10* (2016.08); *H02J 7/0052* (2013.01); *H02J 2007/0062* (2013.01)

(58) Field of Classification Search
USPC ........................................................ 362/103
See application file for complete search history.

(56) References Cited

U.S. PATENT DOCUMENTS

| | | | |
|---|---|---|---|
| 2004/0100792 A1* | 5/2004 | Trzecieski | A43B 1/0036 362/103 |
| 2005/0134191 A1 | 6/2005 | Wong et al. | |
| 2005/0239567 A1 | 10/2005 | Elliot | |
| 2009/0109659 A1* | 4/2009 | Harris | A43B 3/001 362/103 |
| 2009/0273311 A1 | 11/2009 | Beers et al. | |

OTHER PUBLICATIONS

International Preliminary Report on Patentability for related application PCT/US2016/029775 dated May 8, 2018, 6 pages.

* cited by examiner

RECHARGEABLE ILLUMINATING SHOES

TECHNICAL FIELD

The present invention relates to the field of foot ware and more particularly relates to a shoe with an integrated light source for illuminating a user's surrounding area.

DESCRIPTION OF THE PRIOR ART

With the widespread introduction of LEDs to society, lights have been integrated in shoes for some time. Lighting ranges from a novelty effect in some children's shoes to a useful beacon in the heel of first responders' boots. However up to this point in time, not any shoes have been made which feature a lighting system for illuminating the path ahead of a user. Most appear for decorative features on the shoe and serve very little if any functional purpose. When lights are used, turning on such lights have tended to be burdensome as a user must bend down to activate the light source in the shoe. Likewise, lighted shoes have a disadvantage in that they eventually drain their power source, and when the use is for more utilitarian use then cosmetic effect there can be a significant drain on the power source, depleting it further.

The present invention represents a departure from the prior art in that the illuminating shoe of the present invention allows for both remote control and recharging capability. It may also be possible to remove a battery pack from the shoe for charging or replacement.

An improved system of incorporating rechargeable lighting systems into shoes are necessary. Although great strides have been made, considerable shortcomings remain.

SUMMARY OF THE INVENTION

The present invention is a shoe which utilizes an RF switch to activate the light source while also utilizing a rechargeable power source while maintaining waterproof characteristics.

The invention may take many embodiments but features at least one, if not both, of the features of remote control and capability of the power source to be recharged. In view of the foregoing disadvantages inherent in the known types of illuminating shoe, this invention provides a rechargeable illuminating shoe. As such, the present invention's general purpose is to provide a new and improved shoe that may illuminate the area about the user while it may also feature a rechargeable battery pack that is still water and weather proof. The shoe may also feature a remote or RF control to activate the illumination in a steady or predetermined pattern.

To accomplish these objectives, the illuminating shoe comprises lights, which are preferred to be LEDs, a power source and a switch. The switch may be an RF transmitter and paired receiver, with the transmitter located on another object such as a key fob or portable electronic device. The power source should be a weather proof battery but may also feature a port, such as a USB port, for use in recharging the batter pack. The system should also have a control microprocessor and, if RF controlled, a RF control processor.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
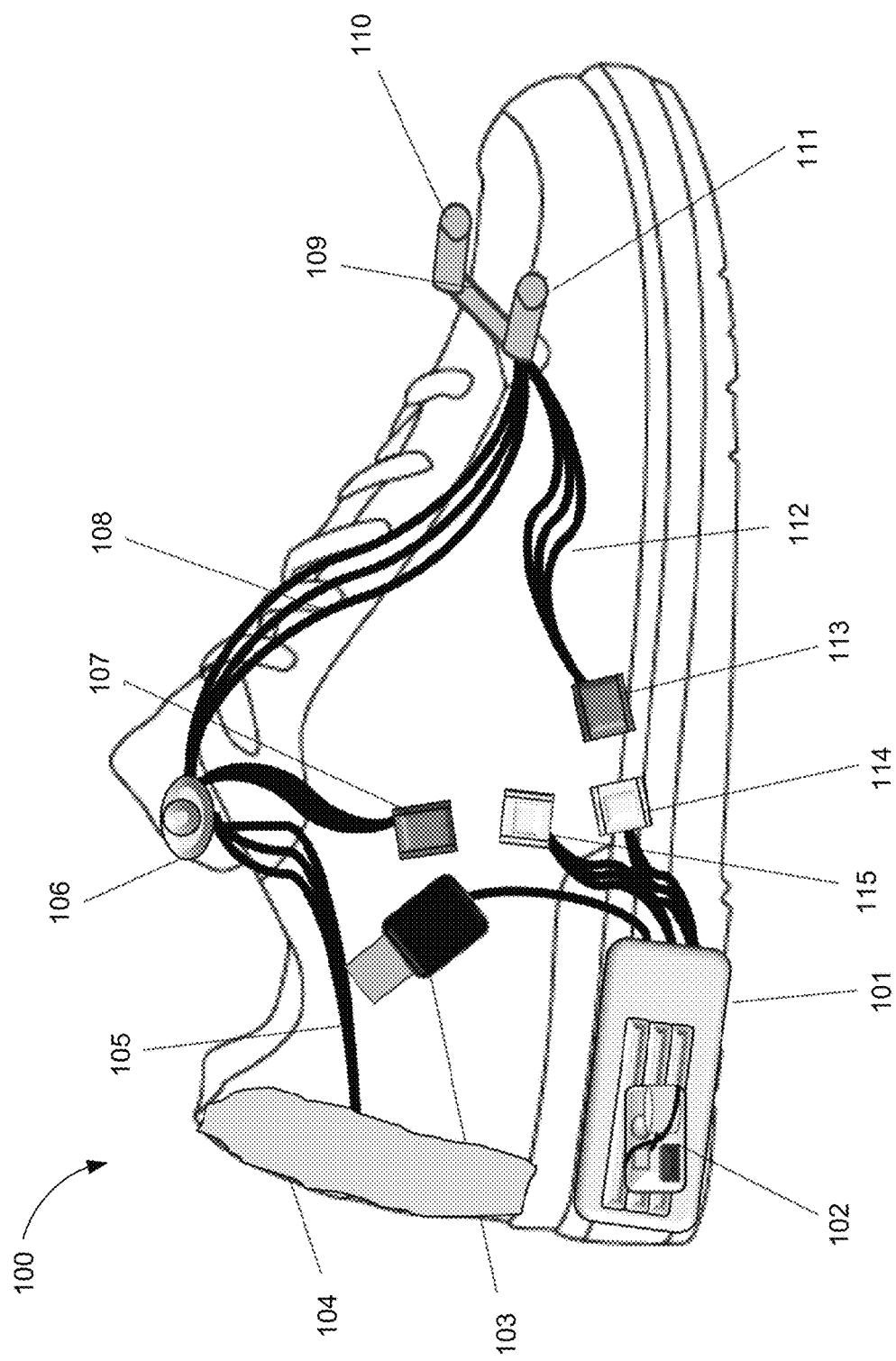
FIG. 1 is a side schematic of a first embodiment of a rechargeable illuminating shoe according to an embodiment of the present application

While the system of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and method in accordance with the present application overcomes one or more of the above-discussed problems commonly associated with existing advertisements. Specifically, the system of the present application is configured to provide a new and improved shoe that illuminates an area about the user. The illuminating light is designed to illuminate an area around the user, for example and area in front of the user while walking or an area to the sides or behind the user. Another feature of the system of the present application is the ability to permit for the selective recharging of a power supply configured to supply power to the lights. Additionally, the system is configured to permit optional remote control capabilities to allow a user to adjust, manipulate, and control one or more features of the lighting system from a device remote in relation to the shoe. These and other unique features of the system are discussed below and illustrated in the accompanying drawings.

The system will be understood, both as to its structure and operation, from the accompanying drawings, taken in conjunction with the accompanying description. Several embodiments of the assembly are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system and method of the present application includes a battery structure, a control board, a charging port, a switch, and a light. The battery structure is configured to provide a source of power to illuminate the light. The switch controls the passage of power to the lights and is configured to optionally regulate a pattern of illumination to the lights. The charging port is configured to allow for the recharging of the battery structure. The control board is configured to regulate the communication of the switch to the light. These and other unique features of the system and method are described herein below.

Referring now to the figures wherein like reference characters identify corresponding or similar elements in form and function throughout the several views. The following Figures describe system 99 and its associated features.

Figure 2:
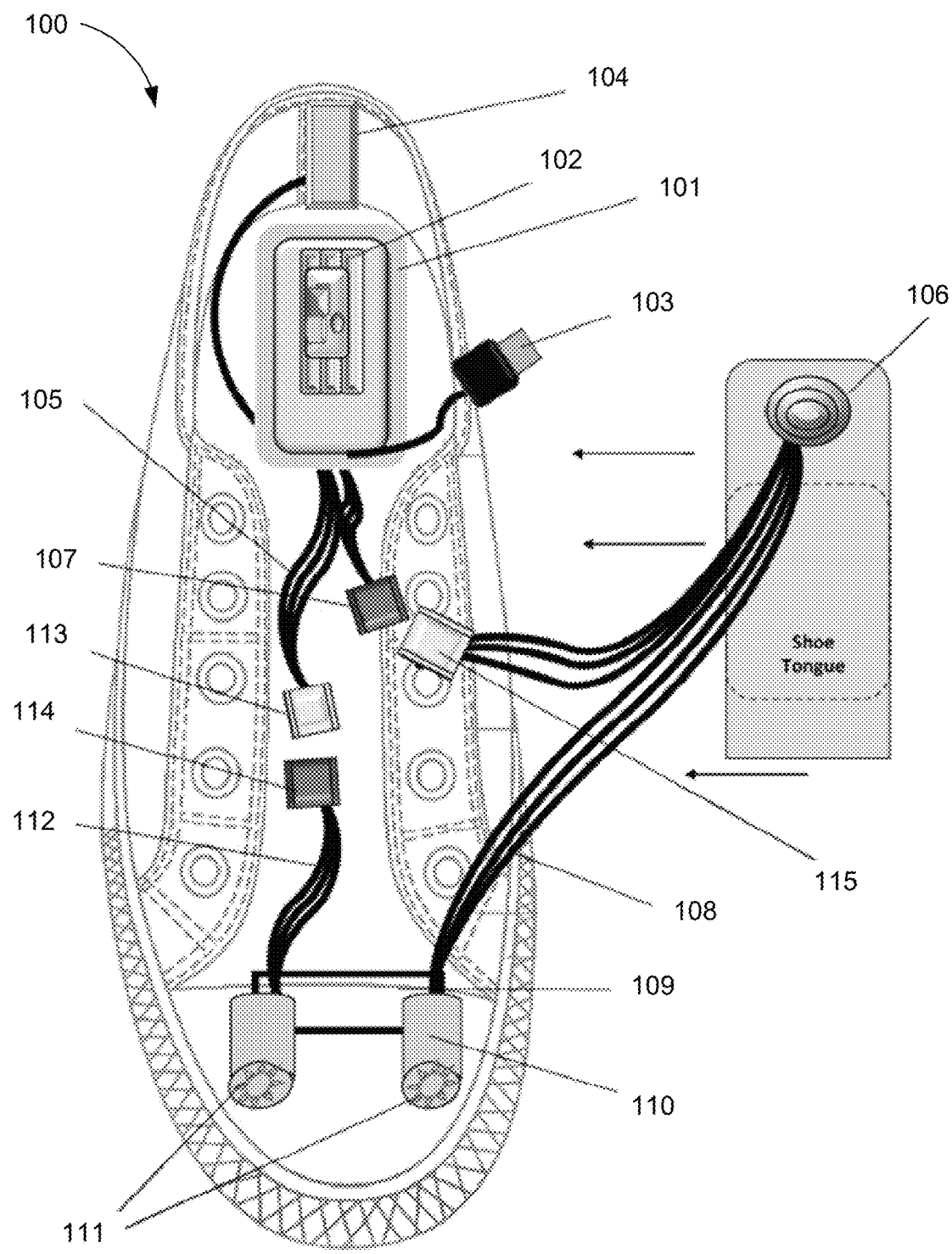
FIG. 2 is a top schematic of the rechargeable illuminating shoe of FIG. 1.

With reference now to the drawings, the preferred embodiment of the illuminating shoes are herein described. It should be noted that the articles "a", "an", and "the", as used in this specification, include plural referents unless the content clearly dictates otherwise. Referring now to FIGS. 1 and 2 in the drawings, a rechargeable illuminating shoe system 101 is illustrated. System 100 includes a battery structure 101, a control board 102, a charging port 103, a switch 106, and a light (104,111). System 100 is configured to selectively illuminate light 4, 111 to provide visibility around the vicinity of the user so as to permit the user to perform one or more tasks without the need to manually hold a light in his/her hand or on his/her head.

With reference to FIGS. 1 and 2, a first embodiment of illuminating shoe system 100 includes battery structure 101. Structure 101 is configured to include a battery power supply for system 100. Ideally, structure 101 is configured to be waterproof so as to prevent moisture from affecting the performance of the power supply. It is understood that structure 101 may be located in a plurality of locations in the shoe body. Although depicted at the heel location of the shoe body, such position is not herein limiting. The heel can be ideally suited because it is usually the thickest and most rigid part of the shoe. However, this is not always the case and later battery structures 101 may be later developed which may make such positioning irrelevant. Therefore, positioning in the heel should be seen as preferred, but not a required part of the invention. In any event, the battery structure 101 should be waterproof and contain at least one rechargeable battery. Currently, a suitable battery structure 101 would be a polymer casing containing a battery of some form with wires to provide operable connection thereto. The polymer casing may then be sealed with an epoxy or by any other known or future discovered means of joining polymers.

A control board 102 may or may not also be contained within the battery structure 101. Control board 102 is ideally a PCB or equivalent in operable connection with the battery of structure 101. Control board 102 is in operable communication between switch 106 and structure 101 and is configured to regulate the performance of the battery power supply and switch 106.

A charging port 103 may also be connected to the control board 102 and/or battery structure 101. The charging port may be a simple USB connector in communication with the control board 102 or any other structure which will allow recharge of the battery. Charging port 103 may be accessible when the battery case 101 is still in the shoe, or may only be accessible when battery case 101 is removed from the shoe, depending on intended design. Any number of different types of connectors may be used, and the use of a USB connector is not herein meant to be limiting.

Lights may be positioned at any location on the shoe. For example, lights may be located on the rear heel portion of the shoe, the front upper toe portion of the shoe, the tongue of the shoe, the sole of the shoe, and so forth. For purposes herein, two separate lights are located on the shoe body to shoe exemplary locations: light 104 and light 111. Light 104 is located at the back heel portion of the shoe and is designed to provide third party users the ability to locate and/or identify the user of system 100. When used in a group, light 104 may be adjusted in appearance to have a unique means of identification, such as color, an illumination pattern, and so forth. When in the dark, light 104 is useful to assist those behind the user in identifying and/or recognizing the user.

Much like light 104, light 111 is coupled to the shoe body and configured to provide both illumination to see the user and for the user to see the local environment. In this case, light 111 is located at the toe portion of the shoe body and is directed in a relatively forward direction (over and beyond the toes). By projecting light forward of the user, the user is able to monitor their location, assess the terrain, avoid danger, and navigate through the environment with ease. Lights 104 and 111 are in communication with structure 101 so as to receive power in order to illuminate. Lights 104 and 111 may be securely affixed within the shoe body or may be selectively detachable for incorporation to any number of shoes for a particular user. For example, if detachable, the user may remove them from one pair of shoes and place them on another pair of shoes.

With the current technology, LEDs are an ideal light source for positioning on the shoe as they are small, use relatively little power, create little heat, and tend to emit powerful light for their size. Of course, any suitable light source may be used, including any future developed lighting technology. Currently, the ideal rear light 104 would be a red 5-8 mm LED, emitting between 40 and 1000 lumens, or a set of the same. Since the rear light 104 is designed for the wearer to be seen, it is important that any chosen lighting structure be chosen for this purpose. The rear area of a shoe also tends to be more rigid, providing adequate support for the light 104.

The front lights 111 are preferred to be at least two white/blue 5-8 mm LEDs, also emitting between 40 and 1000 lumens. As stated previously, lights 104 and 111 may be detachable or integrated into the shoe body. In some instances lights 104 and 111 are coupled to the shoe body with a light mount 109. Light mount 109 is configured to properly secure lights 111/104 to the shoe body and provide for their proper orientation. Such mounts 109 may be configured to provide for the adjustment of orientation of the lights 104 and 111. For example, mounts 109 may be configured to allow for the lights to pivot and/or rotate. Preferably, mounts 109 are a semi-rigid light mount 109 in front of the shoe tongue. Mounts 109 may further include a light hood 110 configured to protect the lights (104/111). Such light hood 110 may be transparent to allow the light to pass through to the environment.

As the purpose of the front light 111 is to illuminate the area in front of the user, a plurality of lights is preferred and they may be angled at any suitable angle to illuminate an intended area. Mount 109 may also allow for adjustment of the light's 109 angle as stated previously. Wiring 105, 108, 112 and connectors 107, 113, 114, 115 place the lights in operable, but removable connection with the control board 102 and provided switch 106. Removability allows for replacement of lights 104, 111 or switch 106, if necessary, and for the battery structure 101 to be removed if this is chosen.

Switch 106 may be used to turn on lights 104, 111 and may be used to impart an illumination pattern as well. Ideally, a simple control is desired due to the constraints of the unit's location, so having a single cycling switch is considered ideal at this time, though others may be used. Switch 106 is in communication with structure 101 and lights 104/111 so as to assist in regulating the power provided to lights 104,111.

The illumination pattern may be any sequence involving the repeated cycling of power to lights 104/111. This may be seen in blinking, wherein the time delay between cycles of on/off may be kept constant or adjusted intermittently over time. Additionally, the illumination pattern may also refer to the adjustment of power provided to the lights wherein the lights remain on but their level of illumination fluctuates. Any mix of these two exemplary types of illumination patterns are possible. The illumination pattern may be selected by the user through switch 106 and/or control board 102. The illumination patterns may be used by the user to convey messages to third parties, such as warnings, calls for help, means of locating, and so forth.

Figure 3:
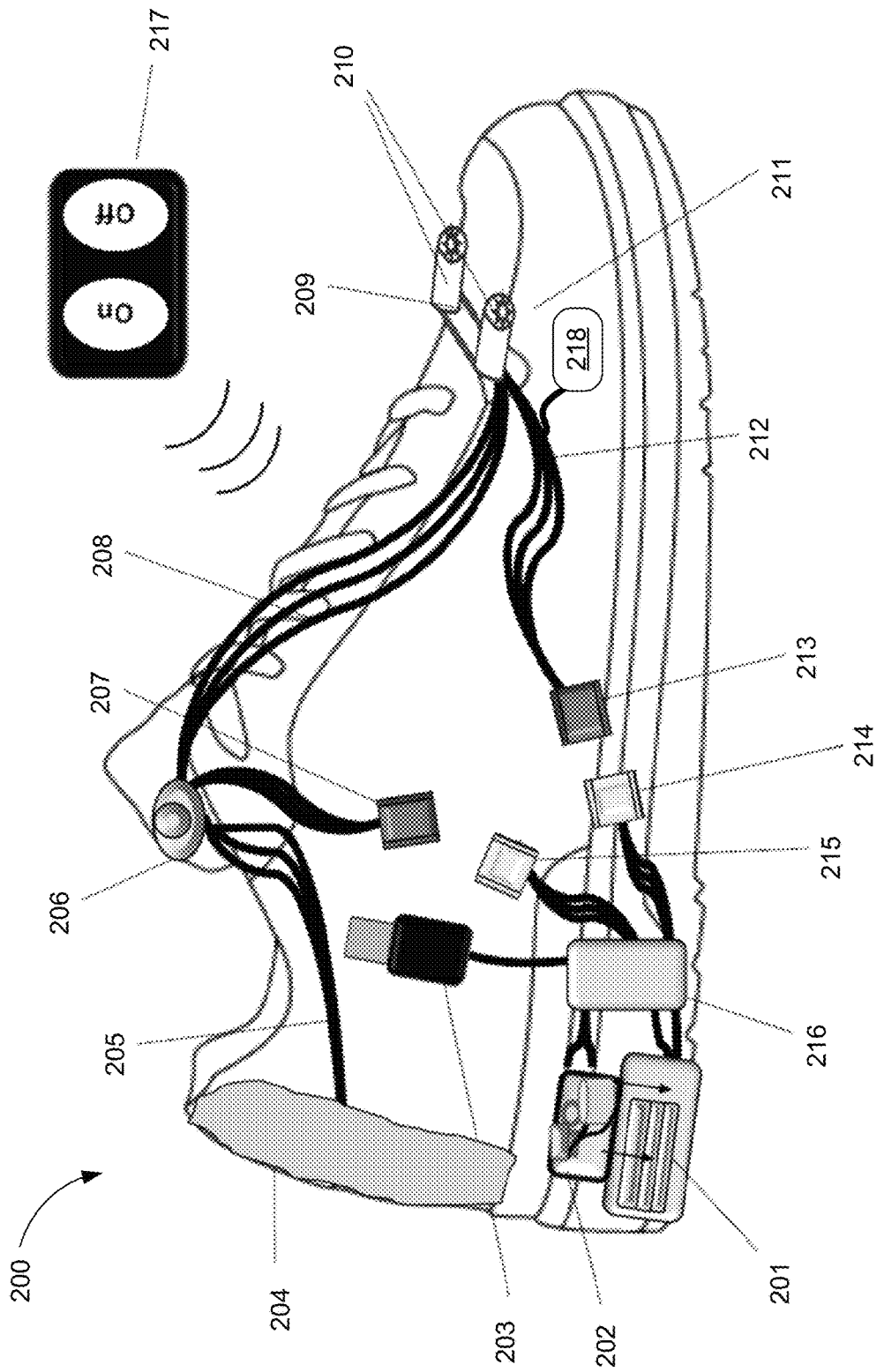
FIG. 3 is a side schematic of a second embodiment of the rechargeable illuminating shoe of FIG. 1.
Figure 4:
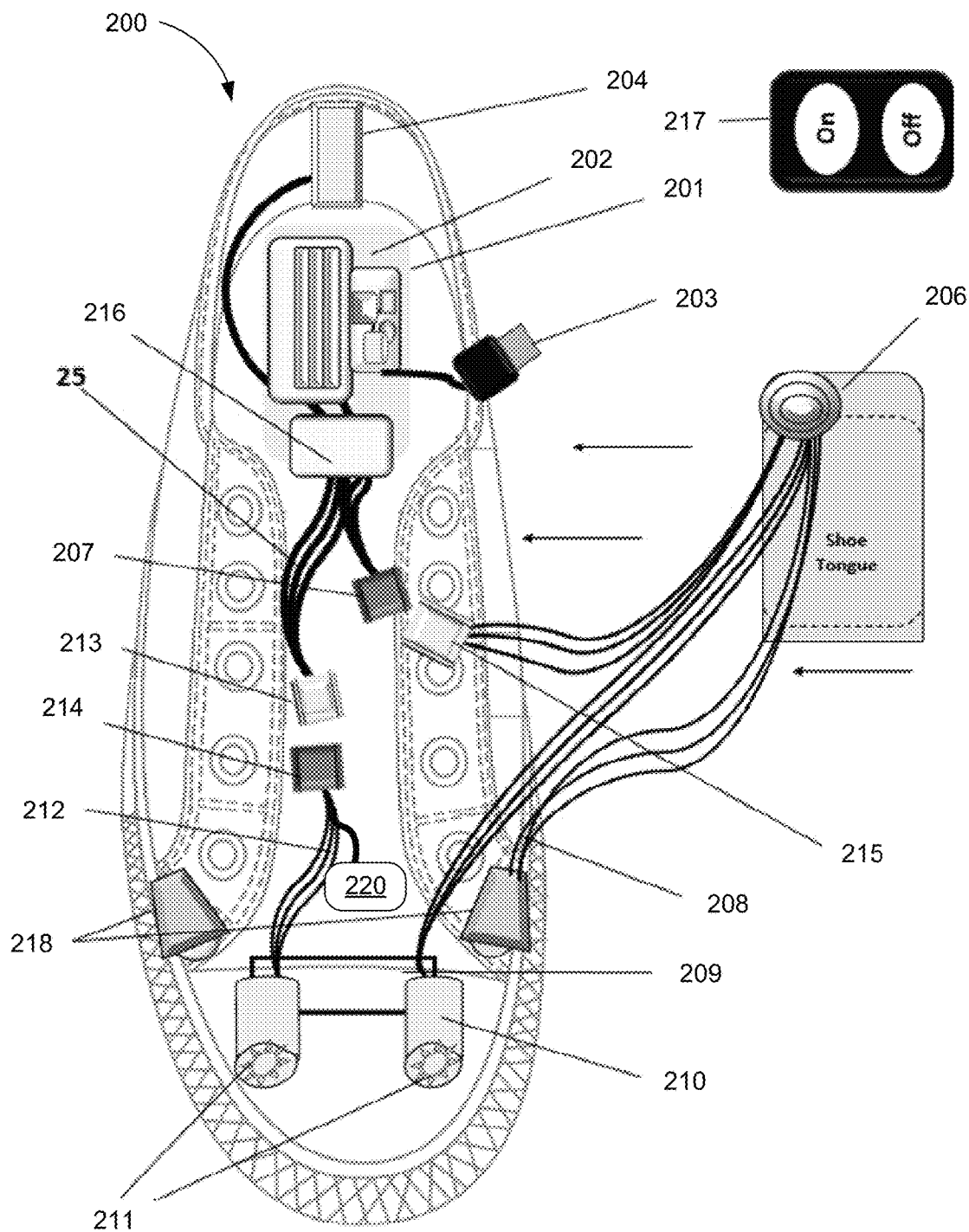
FIG. 4 is a top schematic of the rechargeable illuminating shoe of FIG. 3.

Referring now also to FIGS. 3 and 4 in the drawings, an alternative embodiment of rechargeable illuminating shoe system 100 is illustrated. System 200 is similar in form and function to that of system 100, except as noted herein. Like reference characters identify corresponding or similar elements in form and function throughout the several views. Reference characters in system 200 match those of system 100 of like numbering. For example, reference number 101 and 201 match. Additionally 213 and 113 match.

System 201 further includes the use of components to permit remote operation of system 200 without the need to manually reach down to the shoe. Many different types of communication devices may be used. As depicted in the drawings, system 200 utilizes a radio frequency control switch 217 and requires an additional RF control board 216. Otherwise, structures and connections (201-215) are virtually identical to the first embodiment (101-115). System 200 allows for the use of a second switch 217 to activate or deactivate the shoes' illumination when needed, without bending down to push a switch on their shoes. Switch 206 may be an override switch, or may also be used to activate the shoes' lights 204, 211, depending upon the design. Additional switches and controls may be positioned on an RF transmitting fob or other electronic device, such as illustrated, thus allowing for greater flexibility in blink patterns and controls.

It is further noted that the capabilities of system 200 may also include a digital signature such that each pair of shoes using system 200 can be programed to include a unique identity. This identity may be programed upon manufacturing or as selected by the user. When each system 200 has its own electronic identity/signature, it is conceived that system 200 is configured so as to recognize and detect the proximity of another like system. For example, each system may be programmed to identify its own signature and that of countless other systems. As a second user approaches with a system, such as system 200, and the electronic identity of the second user's system is recognized with the system of the first user, system 200 may be configured to respond with a preprogrammed array of actions involving any one of noise generation and lighting patterns. In general, system 200 is configured to transmit and receive its signature with that of other like systems. When recognized, system 200 may initiate one or more preprogrammed functions. System 200 may utilize any number of wireless methods to communicate including Bluetooth or existing components on board 216.

Figure 5:
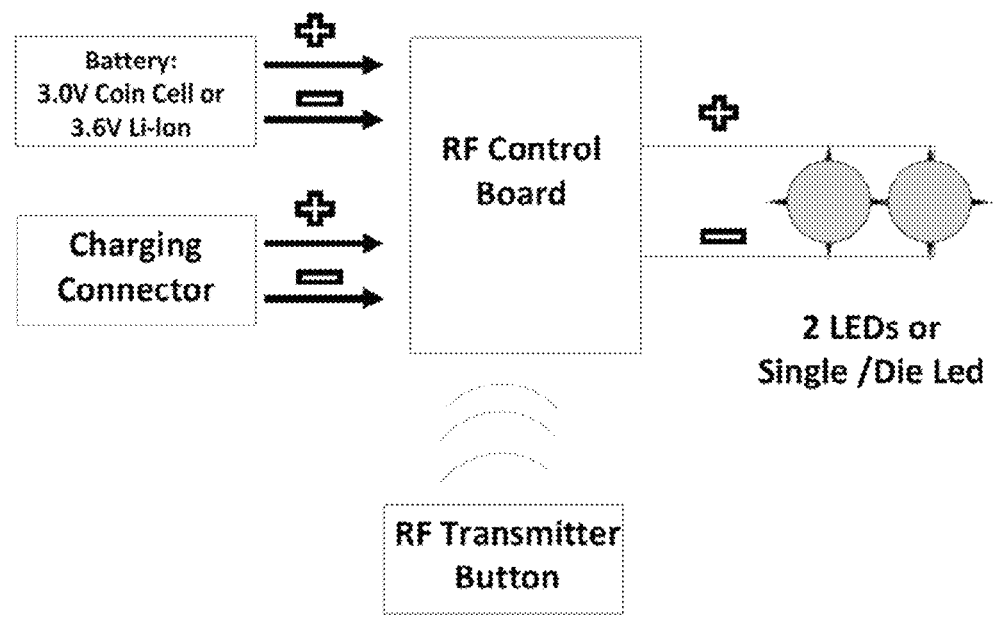
FIG. 5 is a schematic of a representative RF control system for use in the rechargeable illuminating shoes of FIGS. 1-4.

Referring now also to FIG. 5 in the drawings, a simplified schematic for system 200 is illustrated. FIG. 5 illustrates an RF switch system and a single forward set of lights. RF switch 217 may utilize any suitable protocol to communicate with the RF control 216. As noted previously, an RF system or any type of electronic communication device may be used to regulate the performance of system 200.

Figure 6:
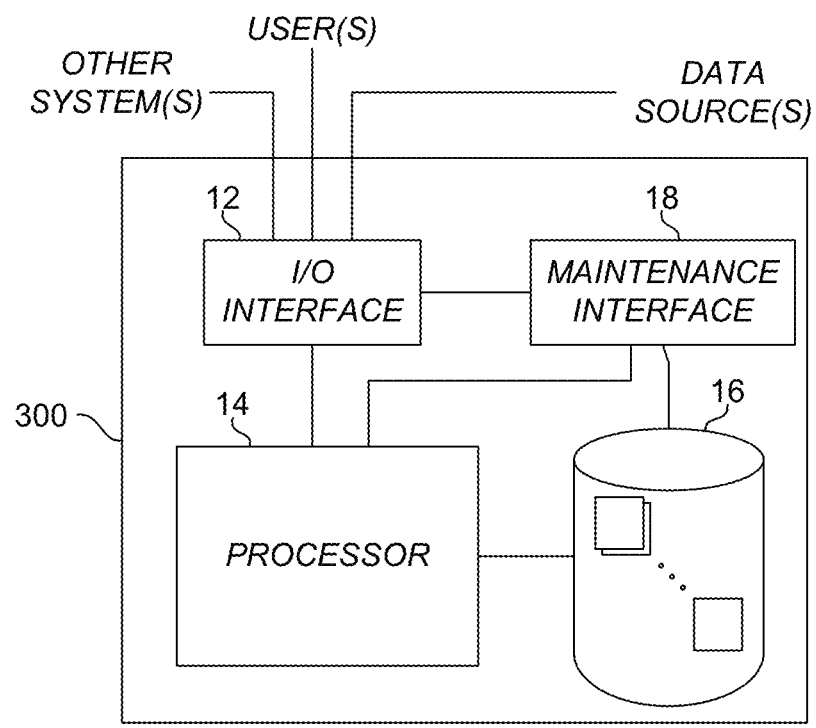
FIG. 6 is an exemplary schematic of an electronic device in communication with the rechargeable illuminating shoes of FIGS. 1-4.

Referring now also to FIG. 6 in the drawings, a schematic of an electronic control device is illustrated. Systems 100 and 200 include control boards 102 and 202 respectively. In some embodiments, boards 102 and 202 may be more robust with internal processing capabilities configured to store information such as selected preprogrammed patterns of illumination and even regulate and monitor one or more sensors. Such activity may be performed without the need of input from the user. Such activity may also necessitate the need to perform one or more processing functions and the ability to relay and receive communication to one or more other electronic devices. In this way, boards 102 and 202 may be in and of themselves a fully functioning electronic device. This exemplary schematic is useful in understanding how systems 100 and 200 transition from a conventional non-looped system to a smart system. A smart system uses a feedback loop of data, which provides evidence for informed decision-making. The system can monitor, measure, analyze, communicate and act, based on information captured from sensors.

For example, systems 100 and 200 may include one or more sensors 220 configured to monitor any one of: user performance (i.e. steps, activity level, and so forth); environmental conditions (i.e. a light sensor to activate lights 104/111/204/211 automatically); and detect any particular substance (i.e. blood, urine, smoke, and sweat for activities like crime scene investigations, hunting, fire rescue, and so forth). The above uses of sensor 220 is not herein limiting and can be used for many other types of activities and purposes in the same spirit and concept of the application. Sensors 220 may be located at any spot on the shoe body to enable optimal performance. Sensors 220 are in communication with boards 102/202. Additionally, transmitter 217 may be an electronic control device, such as a smart phone or tablet wherein application software is used as an interface for the user to control the functions of systems 100 and 200.

Additionally, systems 100 and 200 may include an auxiliary light 218 to detect feces, blood, and urine of animals. Such light may be a UV light or Black Light. Light 218 is shown in FIG. 4 exclusively. Light 218 may also be a red light used for stealth illumination or a green light for stealth/map reading at night. Other types of lights are also possible.

As seen in FIG. 6, a schematic of a general electronic device 300 is illustrated. Device 300 may represent any of boards 102/202 and board 216 and transmitter 217. Device 300 is in communication with sensors 220 (when used). Information processed by device 300 may be relayed to the user or any third party via any known communication methods.

The device 300 includes an input/output (I/O) interface 12, a processor 14, a database 16, and a maintenance interface 18. Alternative embodiments can combine or distribute the input/output (I/O) interface 12, processor 14, database 16, and maintenance interface 18 as desired. Embodiments of device 300 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example smart phones, electronic tablets, and computer workstations, that are suitable for also performing other tasks. Furthermore the computers and machines may use transitory and non-transitory forms of computer-readable media. Non-transitory computer-readable media is to be interpreted to comprise all computer-readable media, with the sole exception of being a transitory, propagating signal.

The I/O interface 12 provides a communication link between external users, systems, and data sources and components of device 300. The I/O interface 12 can be configured for allowing one or more users to input information to device 300 via any known input device. Examples can include a keyboard, mouse, touch screen, microphone, and/or any other desired input device. The I/O interface 12 can be configured for allowing one or more users and devices to receive information output from device 300 via any known output device. Examples can include a display monitor, a printer, a speaker, and/or any other desired output device. The I/O interface 12 can be configured for allowing other systems to communicate with device 300. For example, the I/O interface 12 can allow one or more remote computers to access information, input information, and/or remotely instruct device 300 to perform one or more of the tasks described herein. The I/O interface 12 can be configured for allowing communication with one or more remote data sources.

The database 16 provides persistent data storage for device 300. While the term "database" is primarily used, a memory or other suitable data storage arrangement may provide the functionality of the database 16. In alternative embodiments, the database 16 can be integral to or separate from device 300 and can operate on one or more computers. The database 16 preferably provides non-volatile data storage for any information suitable to support the operation of device 300. Database 16 stores information. Examples may include, advertisement, coupons, messages, directions, phone numbers, and so forth.

The maintenance interface 18 is configured to allow users to maintain desired operation of device 300. In some embodiments, the maintenance interface 18 can be configured to allow for reviewing and/or revising the data stored in the database 16 and/or performing any suitable administrative tasks commonly associated with database management. This can include, for example, updating database management software, revising security settings, and/or performing data backup operations. In some embodiments, the maintenance interface 18 can be configured to allow for maintenance of processor 14 and/or the I/O interface 12. This can include, for example, software updates and/or administrative tasks such as security management and/or adjustment of certain tolerance settings.

The processor 14 is configured to process any one of a number of functions and information, including at least some of proximity data and to transmit and receive advertisement data and promotional information. Processor 14 may access and compare information stored on database 16. Processor 14 can include various combinations of one or more processors, memories, and software components. Additionally, processor 14 may be configured to run various software based applications to perform various tasks and store specific information for a user.

Keep in mind that device 300 is representative of any of the various components within systems 100 and 200.

The current application has many advantages over the prior art including at least the following: (1) rechargeable lights on a shoe body; (2) ability to regulate the performance of the lights over a period of time and within a particular illuminating pattern; (3) provide a new and improved shoe that may illuminate the area about the user; (4) water and weather proof; and (5) provide a remote or RF control to activate the illumination in a steady or predetermined pattern.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

The invention claimed is:

1. An illuminating shoe for a user comprising:
   a shoe body having a sole, heel, tongue and toe;
   a power supply;
   a control processor in operable connection to the power supply, the control processor being programed to include a unique digital signature;
   a mount coupled to an exterior of the shoe body;
   at least one light releasably coupled to the mount, the mount configured to permit angling of the light relative to the shoe body to illuminate a forward area, the at least one light in operable connection with the control processor; and
   a switch in operable connection with the control processor and at least one light, so as to regulate to operation and function of the at least one light;
   wherein the control processor is configured to recognize and detect the proximity of other signatures remote from the user and respond with a programmed action upon recognition including at least one of a noise generation and a lighting pattern.

2. The illuminating shoe of claim 1, further comprising:
   a charging port configured to permit the selective recharging of the power supply.

3. The illuminating shoe of claim 1, wherein the at least one light is forwardly mounted towards the toe of the shoe so as to illuminate the environment around a user.

4. The illuminating shoe of claim 1, the at least one light further comprising at least one light mounted towards the heel of the shoe body.

5. The illuminating shoe of claim 1, the power supply being rechargeable.

6. The illuminating shoe of claim 5, wherein the power supply is rechargeable while remaining in the shoe body.

7. The illuminating shoe of claim 1, wherein the switch is a radio frequency switch.

8. The illuminating shoe of claim 7, the at least one light further comprising at least one light forwardly mounted towards the toe of the shoe.

9. The illuminating shoe of claim 7, the at least one light further comprising at least one light mounted towards the heel of the shoe.

10. The illuminating shoe of claim 1, wherein the power supply is housed within a structure so as to be waterproof.

11. The illuminating shoe of claim 1, wherein orienting the at least one light involves at least one of pivoting and swiveling the at least one light.

12. The illuminating shoe of claim 1, further comprising:
    a light hood in communication with the at least one light and configured to provide protection to the at least one light.

13. The illuminating shoe of claim 12, wherein the light hood is transparent so as to allow for the light emitting from the at least one light to pass through to illuminate the environment.

14. The illuminating shoe of claim 1, further comprising:
    a sensor configured to monitor any one of a user performance, an environmental condition, and detect any particular substance, the sensor in communication with the control processor.

15. The illuminating shoe of claim 1, wherein the switch is configured to regulate the illumination pattern of the at least one light.

* * * * *